Figure 1:
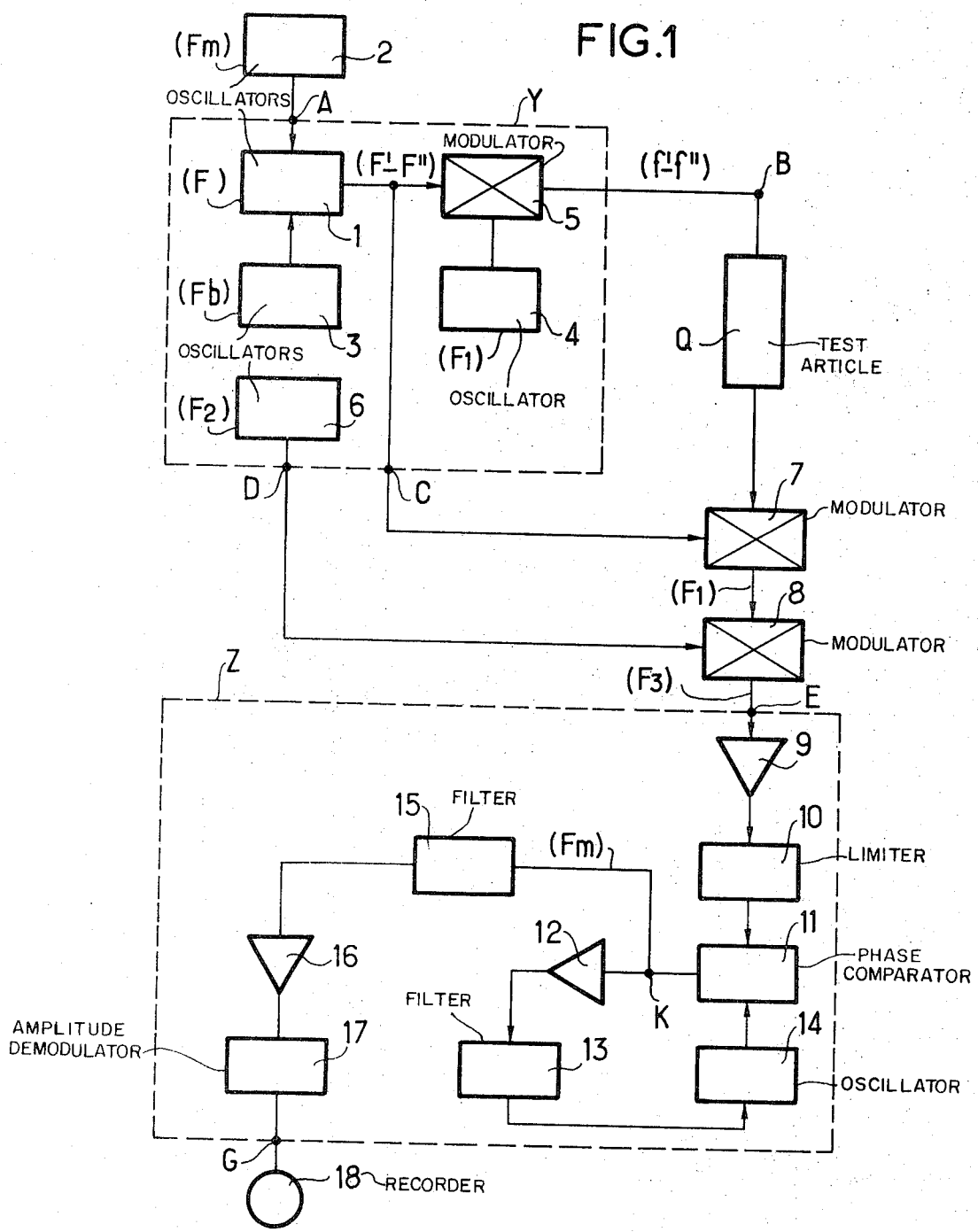

United States Patent [19]
Aillet

[11] 3,838,336
[45] Sept. 24, 1974

[54] APPARATUS FOR MEASURING THE GROUP PROPAGATION TIME IN A QUADRIPOLE

[75] Inventor: Claude Aillet, Lannion, France

[73] Assignee: Societe Lannionnaise D'Electronique Sle-Citerel, Lannion, France

[22] Filed: Apr. 9, 1973

[21] Appl. No.: 349,631

[30] Foreign Application Priority Data
Apr. 7, 1972  France .............................. 72.12356

[52] U.S. Cl............................................. 324/57 R
[51] Int. Cl........................................... G01r 27/00
[58] Field of Search ............... 324/57 R, 57 DE, 82

[56] References Cited
UNITED STATES PATENTS
2,970,258  1/1961  Sinclair ............................ 324/57 R
3,649,909  3/1972  Ort ...................................... 324/82

*Primary Examiner*—Alfred E. Smith
*Attorney, Agent, or Firm*—Craig & Antonelli

[57] ABSTRACT

Apparatus for measuring the group propagation time in a quadripole in dependence on the drivation of the phase curve with respect to the pulsation, this derivation being carried out automatically by sweeping the carrier frequency between limits in combination with a frequency modulation of the carrier frequency.

4 Claims, 2 Drawing Figures

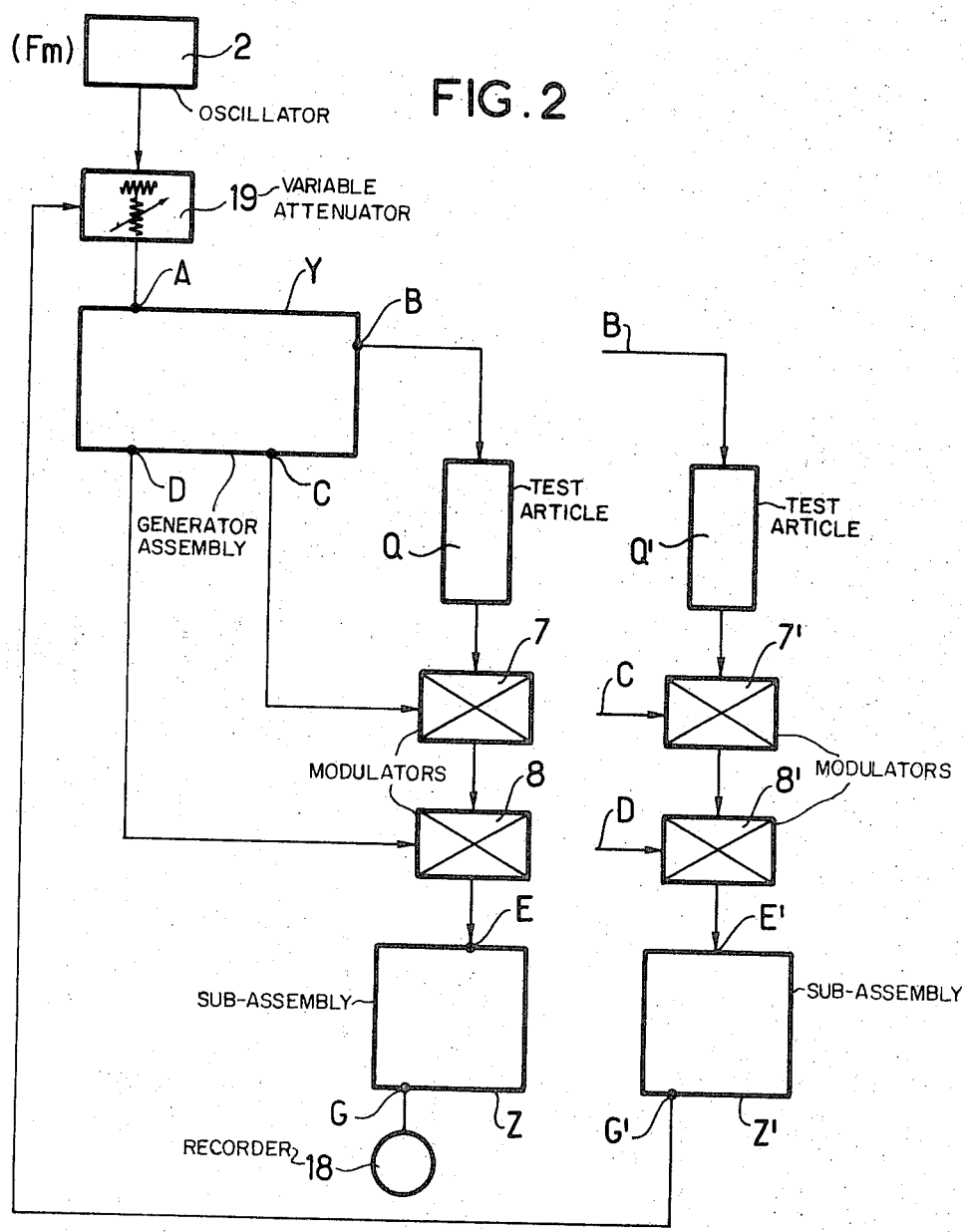

APPARATUS FOR MEASURING THE GROUP PROPAGATION TIME IN A QUADRIPOLE

The present invention concerns apparatus for measuring the group propagation time in a quadripole.

The invention is more particularly concerned with the measurement and recording of the group propagation time of a carrier frequency by means of a method depending on derivation of the phase curve with respect to the pulsation, this derivation being carried out automatically by sweeping the carrier frequency between two limits in combination with a frequency modulation of the carrier frequency.

The invention is applicable to measurements of the transmission parameters of quadripoles, cables and the like, the knowledge of which is indispensible for the construction and exploitation of the corresponding network.

The group propogation speed $V_g$ of the quadripole is the real transmission speed of high frequency energy across the quadripole. It is related to the group propagation time $\tau_g$ by the relation $V_g = L/\tau_g$, where L is the length of the quadripole, in the form of a coaxial cable for example.

If the phase shift $\Psi_i$ experienced by a wave of variable pulsation $\omega_i$ between the input and output of the quadripole is plotted in the $(\Psi,\omega)$, the slope of $\Psi_i/\omega_i$ of the line joining the origin of coordinates to the point $(\Psi_i,\omega_i)$ of the phase cruve is equal to the phase propagation time $\tau_p$. The group propagation time $\tau_g$ of the wave $\omega_i$ equal to the slope of the tangent to the phase curve at the point i. Thus $\tau_g$ equals $d\Psi/d\omega$.

It has long been known to measure the group propagation time by effecting, around a given point $i$ on the phase curve, a finite pulsation shift $\Delta\omega$, to which corresponds a finite phase shift $\Delta\omega$, the quotient $\Delta\Psi/\Delta\omega$ giving, with an acceptable degree of approximation, the group propagation time $\tau_g = d\ \Psi/d\ \omega \approx \Delta\Psi/\Delta\omega$.

Such a measurement can be carried out with a high frequency phase meter. If the wave $\omega_i$ applied to the quadripole is not modulated, the apparatus gives a fixed indication. If the applied wave is frequency modulated, with constant modulation index, the indication given by the apparatus, for a fixed carrier pulsation, undergoes excursions in the two senses proportional to the frequency excursion and also to the slope of the phase curve, that is to say, to the group propagation time of the wave $\omega_i$. On the dephasing measurement, fixed fo each pulsation, is superimposed for each pulsation value an alternating signal at the output of the phase meter which can be extracted, amplified and demodulated, there being thus obtained a measure of the group propagation time for each frequency of the transmitted band.

Such measures, however, are carried out in accordance with modern measurement techniques by sweeping the frequency transmitted in the band under consideration between limits $f'$ and $f''$, the curve being obtained by means of an oscilloscope or by graphical recording. In these conditions, the phase shift experienced by the carrier in the band $f' - f''$ can be more than 360°, and even several times 360°. For example, on a cable 80 meters in length, for a frequency band extending from $f' = 400$ MHz to $f' = 600$ MHz, with a propagation speed assumed constant and equal to 200,000 km/s, the number of wavelengths would pass from 160 – 240 per sweep, with 80 jumps of the phase meter from 360° to 0°, or from $-180°$ to $+180°$ depending on the circumstances. These jumps are inevitably accompanied by oscillatory rebounds which deeply disturb the measurement and the tracing of the group propagation time curve.

In accordance with the invention there is provided apparatus for measuring the group propagation time of a quadripole by sweeping a modulated carrier frequency with a sweep frequency which is significantly lower than the modulation frequency, the apparatus comprising oscillator and modulator circuitry for restoring the phase-modulated carrier at the quadripole output to a phase-modulated fixed intermediate frequency, and a phase-control loop including a low-pass filter with a cut-off frequency between the sweep frequency and the modulation frequency, a phase discriminator having one input connected to receive the phase-modulated intermediate frequency and a second input connect to receive the output frequency of an oscillator controlled by the output of the lowpass filter, and a band-pass filter centered on the modulation frequency and connected to the discriminator output to receive a signal at the modulation frequency, the band-pass filter output being connected to a display or recording device to amplification and demodulation circuitry.

The invention thus enables the previously discussed difficulties to be overcome by means of a system with automatic phase compensation which, for each value of the carrier frequency in the swept band, automatically takes into account and virtually eliminates the carrier phase shift, without affecting the phase shift brought about by the frequency modulation. The autocompensation of the carrier phase is carried out by the control loop comprising the phase discriminator and the voltage-controlled oscillator.

The invention will now be described in more detail, by way of example only and with reference to the accompanying diagrammatic drawings, in which:

FIG. 1 is a block diagram of a first form of apparatus for measuring the group propagation time in a quadripole; and FIG. 2 is a form of the apparatus including an auxiliary device for error correction.

Referring to FIG. 1 the apparatus includes a generator assembly comprising an oscillator 1 providing a variable frequency F. The output of oscillator 1 is frequency-modulated by a low modulation frequency Fm provided by a second oscillator 2. The frequency F of the oscillator 1 varies repetitively between limits f' and f'' under the control of a sweep generator 3 the sweep frequency Fb of which is significantly less than the modulation frequency Fm.

By way of example, F will be assumed variable between F' = 1,300 MHz and F'' = ,1500 MHz. The modulation frequency Fm will be taken as 1 kHz, with a crest frequency excursion ΔF of 1 MHz and a sweep frequency Fb of 10 Hz.

It will be understood that the swept and modulated frequency F could be produced by modulation of a variable nonmodulated frequency by a fixed frequency modulated by the frequency Fm. To simplify the drawing, FIG. 1 shows the same oscillator 1 receiving both the sweep frequency Fb and, at a terminal A, the modulation frequency Fm.

The swept band F' – F'' is transposed to a measurement band $f - f'$, for example, $f = 400$ MHz – $f'' = 600$ MHz, by a modulator 5 receiving the variable frequency F and a fixed frequency F1 provided by an oscillator 4. By way of example, F1 will be taken as equal to 900 MHz.

At the output D of modulator 5, after a band-pass filter (not shown), is obtained a frequency F covering the band 400 – 600 MHz, frequency modulated by the frequency Fm with a frequency excursion $\Delta f$ of $\pm 1$ MHz.

This frequency is applied to the quadripole Q on which measurement is being carried out. The quadripole Q may be a cable, for example. The output of the quadripole Q is connected to one input of a modulator 7 the other input of which is connected to a terminal C connected to the output of the oscillator 1. The modulator 7 thus receives the variable modulated frequency F. At the output of modulator 7, after a band-pass filter (not shown) is obtained the fixed frequency F1, modulated in phase by the sweep signal and modulation signal.

For greater convenience, this phase modulation of the frequency F1 (900 MHz) is transposed to a much lower frequency F3 of 10 MHz. This is effected by modulation in a modulator 8 which receives a frequency F2 (910 MHz in the present example) from the output D of an oscillator 6.

At the output of modulator 8 the signal at frequency F3 is applied to the input of an amplifier 9 the output of which is connected to a limiter 10. The output of the limiter 10 is connected to a phase control loop comprising a phase comparator 11, a high-gain amplifier 12, preferably an operational amplifier, a filter 13, preferably an integral filter cutting off above 50 Hz for example, and an oscillator 14 controlled by the unidirectional voltage at the output of filter 13. The output of the oscillator 14 is connected to the phase comparator 11 to close the control loop.

The output K of the phase comparator 11 is also connected to the input of a band-pass filter 15 centered on the modulation frequency Fm, the output of which is applied through an amplifier 16 to an amplitude demodulator 17, the output G of which is applied to a display or recording device 18, such as an oscilloscope or recorder. This gives the variation curve of the group propagation time of the quadripole Q in the band $F' - F''$.

By means of the modulation at the output of the quadripole Q, the slow phase shifts of the variable carrier frequency produced by the sweeping and the fast phase excursions produced by the frequency modulation are transferred to the fixed frequency F3 of 10MHz.

At the output K of the phase comparator 11, the only slow phase shift which remains is a negligible error signal since the controlled oscillator 14 is held in coincidence with the carrier phase. The phase delay time of the tested quadripole Q thus does not enter into the measurement. The rapid phase shifts (at 1 kHz) however, are not taken into account by the control loop since the filter 13 cuts off at 50 Hz which is well below the modulation frequency 1 kHz. There is thus obtained at the point K an alternating signal at a frequency Fm (1 kHz) corresponding to the response of the non-compensated phase comparator 11, that is to say, corresponding to the phase meter function of the phase comparator with regard to the frequency excursion $\Delta f$ (1 MHz) and the slope of the phase curve of the quadripole Q. that is to say, its group propagation time.

It will be appreciated that, in order to obtain the benefit of the invention, the response of the phase comparator 11 must not cover a range exceeding 360°. This means that the duration $\tau$ which is the reciprocal of the crest-to-crest frequency excursion must have a value greater than the propagation time in the quadripole under test. In the present example, for a speed of $2 \times 10^8$ m/s, the propagation time for a length of 80 m is 400 ns. With the crest-to-crest frequency excursion = 2 MHz, $\tau$ is equal to 500 ns. The requisite condition is thus observed.

The elements 9 to 17 in FIG. 1 form a second subassembly Z with input E and output G.

Referring to FIG. 2, it may be that the modulation of the output frequency of oscillator 2 by the modulation frequency is not strictly linear in the entire band F1 – F2. In this case there appears at K a component at frequency Fm which is produced not by phase non-linearities of the quadripole Q but by the modulation.

To reduce this effect, the system of FIG. 1 is modified as shown in FIG. 2, where the reference numerals also used in FIG. 1 have the same meaning as in FIG. 1. A quadripole Q' of very high phase linearity is connected to terminal B of subassembly Y. The quadripole Q may be, for example, an accurate delay line with a cut-off frequency very much higher than the highest transmitted frequency.

The output of quadripole Q' is connected to the input of a modulator 7' the other input of which is connected to terminal C of subassembly Y. The output of modulator 7' is applied to one input of a modulator 8' the other input of which is connected to terminal D subassembly Y. Modulators 7' and 8' are identical to modulators 7 and 8.

The output of modulator 8' is applied to the input E' of subassembly Z' which is identical to subassembly Z.

A variable attenuator 19 is connected between the output of the oscillator 2 and terminal A of the subassembly Y. Its control input is connected to the output G' of subassembly Z', corresponding to output G of subassembly Z.

There is thus obtained a feedback effect which reduces to a negligible value the non-linearity of the modulation.

What is claimed is:

1. Apparatus for measuring the group propagation time in a quadripole element comprising first means for applying to said quadripole element a modulated carrier frequency swept with a sweep frequency which is significantly lower than the modulation frequency; second means for restoring the phase-modulated carrier at the quadripole element output to a phase-modulated fixed intermediate frequency; a phase-control loop including a phase discriminator having one input connected to said second means to receive the phase-modulated intermediate frequency and a second input connected to receive the output frequency of a voltage controlled oscillator, low-pass filter means with a cut-off frequency between the sweep frequency and the modulation frequency connected between the output of said discriminator and the input of said voltage controlled oscillator for eliminating said sweep frequency from the signal applied to said voltage controlled oscillator; a band-pass filter centered on the modulation frequency and connected to the discriminator output to receive a signal at the modulation frequency; an indicator, and amplification and demodulation means connecting said indicator to the output of said band-pass filter.

2. Apparatus as defined in claim 1 wherein said first means includes a variable frequency oscillator, a modulation frequency oscillator connected to said variable frequency oscillator, a sweep generator connected to said variable frequency oscillator, a modulator connected to receive the output of said variable frequency oscillator at one input thereof, and a further oscillator connected to a second input of said modulator, the output of said modulator being connected to said quadripole element.

3. Apparatus as defined in claim 2 wherein said second means includes a further oscillator a second modulator having one input connected to the output of said quadripole and a second input connected to the output of said variable frequency oscillator, and a third modulator having one input connected to the output of said second modulator and a second input connected to said further oscillator.

4. Apparatus as defined in claim 2, further comprising a linear phase reference quadripole having its input connected to receive the output of said first means in the same manner as the quadripole under test, third means corresponding to said second means to restore the phase-modulated carrier at the reference quadripole output to the same phase-modulated and fixed intermediate frequency, and a further phase-control loop identical to said first loop, the band-pass filter output of the further loop being connected to a control input of a variable attenuator connected between said modulation frequency oscillator and said variable frequency oscillator in said first means.

* * * * *